United States Patent [19]

Groothoff

[11] E Re. 30,133

[45] Reissued Oct. 30, 1979

[54] DEFLECTION UNIT FOR COLOR TELEVISION DISPLAY TUBES

[75] Inventor: Adriaan J. Groothoff, Eindhoven, Netherlands

[73] Assignee: U.S. Philips Corporation, New York, N.Y.

[21] Appl. No.: 849,880

[22] Filed: Nov. 9, 1977

Related U.S. Patent Documents

Reissue of:

[64] Patent No.: 3,991,392
Issued: Nov. 9, 1976
Appl. No.: 586,534
Filed: Jun. 13, 1975

[30] Foreign Application Priority Data

Jun. 28, 1974 [NL] Netherlands ..... 7408742

[51] Int. Cl.[2] ..... H01F 5/00

[52] U.S. Cl. ..... 335/213; 335/210

[58] Field of Search ..... 335/213, 210

[56] References Cited

U.S. PATENT DOCUMENTS

| | | | |
|---|---|---|---|
| 3,469,218 | 9/1969 | Zoladz | 335/210 |
| 3,875,543 | 4/1975 | Gostyn et al. | 335/213 |

*Primary Examiner*—Harold Broome
*Attorney, Agent, or Firm*—William J. Streeter; Henry I. Steckler

[57] ABSTRACT

Before mounting, coils heads comprising clearly defined faces and edges are formed on deflection coils by moulding. The sides of the flared portion of the coils are also clearly defined by the same operation. After mounting, the coil bears in the coil holder by way of the faces and edges formed.

The sides of the flared portion abut against projections formed on the coil holder. The flared portion is completely clear from the coil holder.

3 Claims, 2 Drawing Figures

DEFLECTION UNIT FOR COLOR TELEVISION DISPLAY TUBES

Matter enclosed in heavy brackets [ ] appears in the original patent but forms no part of this reissue specification; matter printed in italics indicates the additions made by reissue.

The invention relates to a deflection unit which is adapted to be arranged about a colour television display tube at the area where a rearmost cylindrical portion of the display tube, accommodating electron guns, changes over into a foremost, flared portion which adjoins a display screen, the said deflection unit mainly consisting of a ferromagnetic ring, a line coil system, a frame coil system and two coil holders, one holder containing the line coil system, consisting of an upper coil and a lower coil for the horizontal deflection, the other coil holder containing the frame coil system, consisting of a left-hand coil and a right-hand coil for the vertical deflection, the four said coils being moulded into a saddle-shaped assembly, on which a foremost coil head, a rearmost coil head and an intermediate flared portion can be distinguished.

Herein, the term "coil holder" is to be understood to cover also the support of the line coil system.

A deflection unit of this kind is described in Netherlands patent application 7,304,217. It appears from this application that so as to obtain an acceptable deflection accuracy, a properly proportioned and positioned deflection field is required. Using the device described in the said application, the desired shape of the deflection coils can be adequately approximated, but due to tolerances in the mounting of the deflection coils in the associated coil holders deviations arise between deflection units manufactured in the same manner. As a result, readjustment is required, which is material and time consuming and hence expensive. Avoiding these deviations is important notably for colour television display tubes having large deflection angles (110° deflection) where the magnetic field built up by the coils may deviate only little from the desired optimum field distribution in the display tube.

The invention has for its object to avoid the deviations occurring during the mounting of the deflection coils in the coil holders.

To this end, the invention is characterized in that the two coils of at least one of the coil systems abut against abutment faces, formed on the coil holder, only by portions of the lateral boundaries of the flared portions and of the coil heads, whilst the flared curved surfaces of the coils are clear from the coil holders.

The invention will be described in detail hereinafter with reference to a preferred embodiment of the deflection unit which is shown in a diagrammatic drawing.

Figure 1:
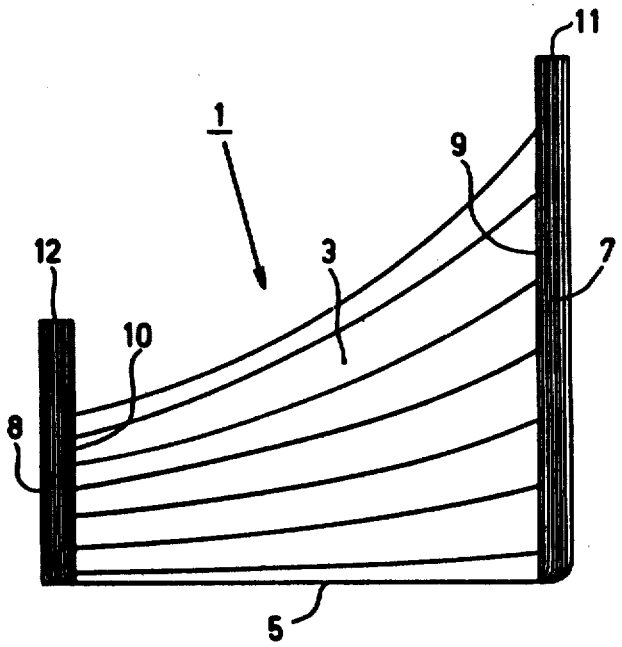
FIG. 1 is a diagrammatic side elevation of a saddle-shaped deflection coil.

The deflection coil 1 shown in FIG. 1 is formed by winding and moulding. The deflection coil 1 comprises a flared portion 3 which is laterally bounded by a moulded face 5 which is clearly defined by moulding, a foremost coil head 7 and a rearmost coil head 8, the sides 9 and 10 thereof which face each other and the adjoining outer edges 11 and 12 also being accurately defined during moulding.

Figure 2:
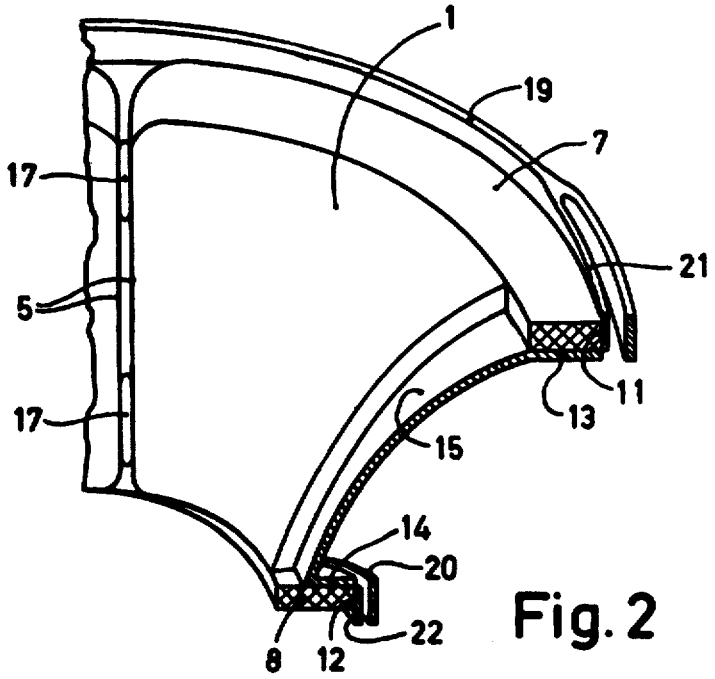
FIG. 2 is a diagrammatic, partial longitudinal sectional view through a deflection coil with coil holder.

As is shown in FIG. 2, after mounting the foremost and rearmost coil heads of deflection coil 1 abut against a foremost and a rearmost supporting face 13 and 14, respectively, of coil holder 15 in a slightly clamping manner. The deflection coil 1 is locked against rotation in that the coil sides 5 abut against projections 17 provided on the coil holder 15. The outer edges 11 and 12 of the coil heads 7 and 8 abut against resilient portions 21 and 22 of the collars 19 and 20 formed on the supporting faces 13 and 14 of the coil holder 15. Due to the resilience of the abutment faces 21 and 22, the sides of the coil are pressed against the projections 17 of the coil holder 15, so that quick positioning is automatically achieved. The field prevailing in the display tube is mainly governed by the shape and the location of the flared portion of the coil. The curvature and the position of the flare portion can be fully determined by the abutting of the clearly defined edges formed on the coil heads and on the flared portions against the coil holder. The abutting of the flared portion against the coil holder surface, however, could have an adverse effect on the positioning of the deflection coil. Therefore, a clearance is maintained between the coil holder and the flared portion of the deflection coil. It was found that sufficient space remains between the coil holder and the flared portion of the deflection coil if the distance between the said components is 0.3 mm.

What is claimed is:

1. In a deflection unit having two coil holders each having abutment faces, one coil holder including a line coil system having an upper coil and a lower coil for horizontal deflection, the other coil holder including a frame coil system having a left hand coil and a right hand coil for vertical deflection, the four said coils *each* being moulded into a saddle [shaped assembly] *shape and each* having a foremost coil head, a rearmost coil head and an intermediate flared portion, wherein the improvement comprises the two coils [of] *held by* at least one of [the] *said* coil [systems] *holders* abut against [said] *the* abutment faces *of said at least one coil holder* by portions of the lateral boundaries of the flared portions and of the coil heads, the flared curved surfaces of [the] *said two* coils being clear from [with] the coil holders.

2. A deflection unit as claimed in claim 1, wherein [each abutment face comprises of the coil holder which exerts] *said at least one coil holder has a collar with resilient portions which form abutment faces and exert*a spring pressure on the coil heads.

3. A deflection unit as claimed in claim 1, wherein the distance between the flared portion of a coil and the associated coil holder is at the most 0.3 mm.

* * * * *